T. R. Hartell,
Ornamenting Glass.

No. 58,410.    Patented Oct. 2, 1866.

Witnesses:
Wm Albert Little
S. K. Horace Godwin

Inventor:
T. R. Hartell
by his Attorney
Henry Howson

UNITED STATES PATENT OFFICE.

THOS. R. HARTELL, OF PHILADELPHIA, PENNSYLVANIA.

MODE OF ORNAMENTING AND LETTERING GLASS.

Specification forming part of Letters Patent No. 58,410, dated October 2, 1866.

*To all whom it may concern:*

Be it known that I, T. R. HARTELL, of Philadelphia, Pennsylvania, have invented an Improved Mode of Ornamenting and Lettering Articles of Glass; and I do hereby declare the following to be a full, clear, and exact description of the same, reference being had to the accompanying drawings, and to the letters of reference marked thereon.

My invention consists in ornamenting or lettering articles of glass by forming recesses or depressions in the same, and filling the depressions with white plaster, which when seen through the body of the glass has a brilliant silvery appearance.

In order to enable others to practice my invention, I will now proceed to describe the manner of carrying it into effect.

Figure 2:
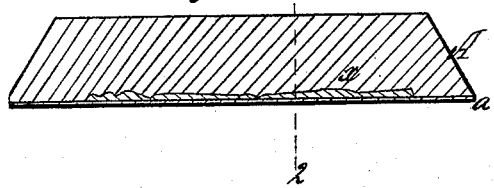
Figure 3:
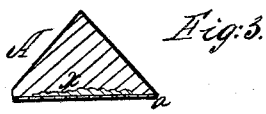
Figure 1:
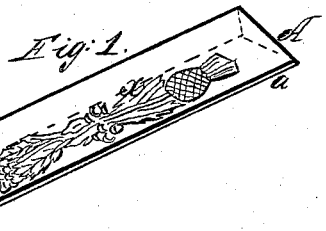
Figure 4:
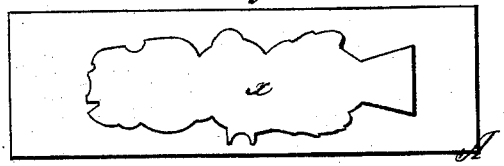

On reference to the accompanying drawings, which form a part of this specification, Figure 1 is a perspective view of a block of glass ornamented according to my improvement; Fig. 2, a longitudinal section; Fig. 3, a transverse section on the line 1, 2, Fig. 2; and Fig. 4, an inverted plan view.

A is a glass prism, the opposite ends of which are beveled, and in the under side or base of the prism is an impression or indentation of an ornamental figure. This indentation is filled with ordinary white plaster-of-paris, which when seen from above or through the body of the glass has a brilliant silvery appearance.

It will be evident that the invention is applicable to the ornamentation of various glass objects, such, for instance, as the bases of glass goblets, wine-glasses, &c., and that it may be used to advantage in the manufacture of cheap door-plates and numbering-plates and other useful objects.

As the indentations or depressions are made while the glass is in a plastic state, it will be evident that this mode of ornamenting glass objects is both simple and economical.

I am aware that cavities have been made in glass, and these cavities lined with silver. I am aware, too, that various articles have been embedded in masses of glass—a process demanding great care and tedious manipulation. I claim neither of these modes of ornamenting glass; but I limit my claim to the use of white plaster for filling indentations pressed in glass for producing the effect mentioned—that is to say:

I claim as my invention and desire to secure by Letters Patent—

Ornamenting and lettering glass objects by making depressions in the same while the glass is in a plastic state, and filling or lining these depressions with white plaster while in a plastic state, as and for the purpose set forth.

In testimony whereof I have signed my name to this specification in the presence of two subscribing witnesses.

THOS. R. HARTELL.

Witnesses:
CHARLES E. FOSTER,
W. J. R. DELANY.